United States Patent
Pollock et al.

(10) Patent No.: US 11,423,353 B2
(45) Date of Patent: Aug. 23, 2022

(54) SYSTEM FOR DISCOVERING THE CAPABILITIES OF INSTRUMENTS CONNECTED TO A DATA PROCESSING SYSTEM

(71) Applicant: Keysight Technologies, Inc., Santa Rosa, CA (US)

(72) Inventors: Graham S. Pollock, Folsom, CA (US); Stanley T. Jefferson, Palo Alto, CA (US); Daniel L. Pleasant, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 72 days.

(21) Appl. No.: 16/653,880

(22) Filed: Oct. 15, 2019

(65) Prior Publication Data

US 2020/0111049 A1 Apr. 9, 2020

Related U.S. Application Data

(63) Continuation of application No. 14/634,673, filed on Feb. 27, 2015, now abandoned.

(51) Int. Cl.
*G06Q 10/08* (2012.01)
(52) U.S. Cl.
CPC .................. *G06Q 10/087* (2013.01)
(58) Field of Classification Search
None
See application file for complete search history.

(56) References Cited

U.S. PATENT DOCUMENTS

| | | |
|---|---|---|
| 5,892,458 A | 4/1999 | Anderer |
| 6,178,359 B1 | 1/2001 | Dobyns |
| 6,725,257 B1* | 4/2004 | Cansler ............... G06Q 10/087 |
| | | 709/203 |
| 6,775,244 B1 | 8/2004 | Hattig |
| 6,829,726 B1 | 12/2004 | Korhonen |
| 7,065,769 B1 | 6/2006 | Tolopka |

(Continued)

OTHER PUBLICATIONS

Nonfinal Office Action dated Feb. 23, 2017, U.S. Appl. No. 14/634,673.

(Continued)

*Primary Examiner* — Scott A Zare

(57) ABSTRACT

A method for operating a data processing system to discover the attributes of instruments in a set of instruments connected thereto is disclosed. The method causes the data processing system to determine all instruments in the set of instruments connected thereto by sending a first query on each communication link connected to the data processing system. The data processing system receives a response that identifies one of the instruments and a model identification code for that instrument. The data processing system retrieves model configuration information from an instrument catalog database attached to the data processing system based on the manufacturer's catalog information. The model configuration information includes an option that is available on the one of the instruments having the manufacturer's catalog information and a query that will cause that instrument to provide information on whether that option is installed on the one of the instruments.

20 Claims, 2 Drawing Sheets

(56) References Cited

U.S. PATENT DOCUMENTS

| | | |
|---|---|---|
| 7,152,116 B1 | 12/2006 | Austin |
| 7,233,790 B2 | 6/2007 | Kjellberg |
| 7,958,226 B2 | 6/2011 | Bernardi et al. |
| 8,176,503 B2 | 5/2012 | Ford et al. |
| 8,726,298 B1 | 5/2014 | Desai |
| 8,819,708 B2 | 8/2014 | Shutt |
| 8,949,815 B2 | 2/2015 | Phaedrus |
| 2005/0039193 A1 | 2/2005 | Choi et al. |
| 2007/0101342 A1 | 5/2007 | Flegg |
| 2008/0059339 A1 | 3/2008 | Gualandri |
| 2009/0063709 A1 | 3/2009 | Rice |
| 2009/0109055 A1* | 4/2009 | Burch ............... H04W 24/00 340/870.02 |
| 2010/0325019 A1 | 12/2010 | Avery |
| 2015/0362620 A1* | 12/2015 | Parmeshwar ......... G01V 11/00 702/6 |

OTHER PUBLICATIONS

Final Office Action dated Jul. 21, 2017, U.S. Appl. No. 14/634,673.
Advisory Action dated Sep. 27, 2017, U.S. Appl. No. 14/634,673.

* cited by examiner

SYSTEM FOR DISCOVERING THE CAPABILITIES OF INSTRUMENTS CONNECTED TO A DATA PROCESSING SYSTEM

RELATED APPLICATION

This application is a continuation of U.S. patent application Ser. No. 14/634,673 filed on Feb. 27, 2015.

BACKGROUND

The number and variety of instruments that are available to a researcher has grown to the point that just keeping track of all the instruments that are available in an organization and the capabilities of each instrument has become a daunting task. Any given instrument may have a number of different hardware configurations and options. For instruments that have slots for inserting different modules, the configuration of the instrument with the currently installed modules and existing other modules within the organization for the slots in the instrument must be determined. In addition, the instrument may have different software configurations. The individual software programs may require separate licenses, and hence, the capabilities of the instrument can be increased by purchasing additional licenses.

When a researcher wants to put together an experimental setup to make a measurement, the researcher must ascertain which instruments are available and the capabilities of those instruments to determine the best experimental setup that will meet the researcher's needs. If an instrument that does not meet the needs of the researcher is not available, the researcher must determine if one of the current instruments can be upgraded to provide the required functionality. For example, the researcher could upgrade the instrument by purchasing a license that activated an internal software routine.

This problem is further complicated by the fact that any given organization may have instruments that are distributed around the organization in a manner that is not easily ascertained by an individual researcher.

Accordingly, a method for discovering the existing instruments and their capabilities within an organization as well as the potential capabilities of those instruments is needed.

SUMMARY

The present invention includes a method for operating a data processing system to discover the attributes of instruments in a set of instruments connected thereto. The method causes the data processing system to determine all instruments in the set of instruments connected thereto by sending a first query on each communication link connected to the data processing system. The data processing system receives a response that identifies one of the instruments and a model identification code for that instrument. The data processing system retrieves model configuration information from an instrument catalog database attached to the data processing system. The model configuration information includes an option that is available on that one of the instruments and a query that will cause that instrument to provide information on whether that option is installed on the one of the instruments.

In one aspect of the invention, the instrument catalog database includes all of the options that are available on each instrument having a manufacturer's catalog information included in the instrument catalog database.

In another aspect of the invention, each of the instruments in the set of instruments responds to the first query with the model identification code in a predetermined format, the model identification code uniquely identifying that instrument in the instrument catalog database.

In a still further aspect of the invention, the method also causes the data processing system to generate a bench top instrument database entry for the one of the instruments, the bench top instrument database entry specifying all options that are installed on the one of the instruments. The bench top instrument database preferably includes all options that are installed on all instruments in the set of instruments that are connected to the data processing system. The bench top instrument database preferably includes information specifying a type of measurement that can be made by one of the instruments.

In yet another aspect of the invention, the method causes the data processing system to retrieve bench top instrument database entries for all instruments in the bench top instrument database satisfying a user defined criterion. In one aspect, the retrieved bench top instrument database entries are ordered by user supplied criterion. In another aspect, the data processing system retrieves bench top instrument database entries for all instruments in the bench top instrument database that would satisfy the user defined criterion if the instrument was equipped with an option that is available for the instrument, but not currently installed on that instrument. In another aspect, the data processing system retrieves catalog instrument database entries for all instruments in the catalog instrument database that would satisfy the user defined criterion.

DETAILED DESCRIPTION

Figure 1:
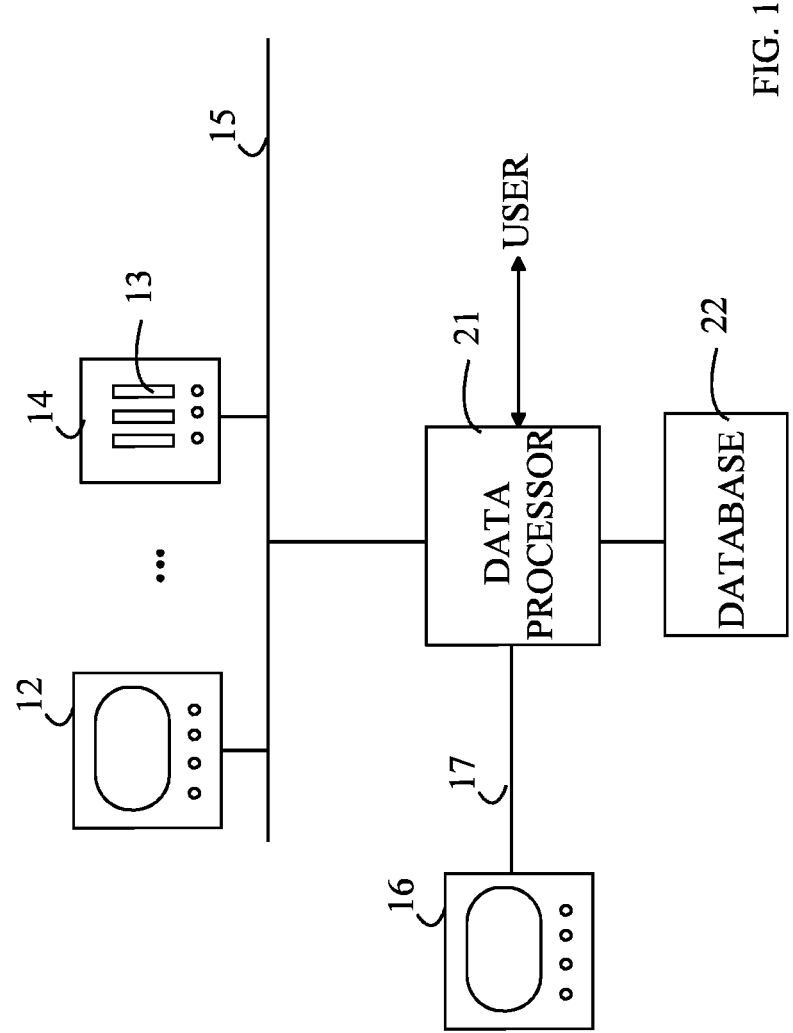
FIG. 1 illustrates a number of instruments connected to a data processing system according to the present invention.

The manner in which the present invention provides its advantages can be more easily understood with reference to FIG. 1, which illustrates a number of instruments according to the present invention connected to a data processing system according to the present invention. Exemplary instruments are shown at 12, 14, and 16. The instruments can be connected to data processing system 21 by any of a number of buses including a local network 15 and a direct bus 17 on a serial bus or the like. The instruments in question may also include modules 13 that plug into an instrument and provide additional functionalities to that instrument. In the following discussion, the instruments that are connected to data processing system 21 will be referred to as the "bench top instruments".

The present invention is based on the observation that automatically determining the configuration and capabilities of the instruments that are actually connected to data processing system 21 presents significant challenges. Even a single instrument can have a wide range of options, both hardware and software. In addition, there are typically a very large number of different instruments that could be connected to data processing system 21, each with different capabilities and options. This problem is further complicated by the need to combine a number of instruments to arrive at a measurement solution for a specific problem.

To design a specific measurement solution, the researcher must start by determining the actual configuration of the bench top instruments including the options that are actually installed on those instruments. Given that information, the researcher must then determine the measurement capabilities of the bench top instruments to determine if there is a solution to the measurement problem using the bench top instruments. If there is more than one such solution, the researcher must rank the solutions on some basis to determine the solution to use. If there is not a satisfactory solution that can be constructed with the current bench top instruments, the researcher needs to be able to determine if purchasing an option for one of the existing bench top instruments, or an other instrument, will allow a satisfactory solution to be constructed.

This problem is further complicated by the fact that the pool of available instruments that are available for augmenting the current bench top instruments is ever changing. New options and software are introduced constantly. As new options are introduced, the capabilities of the bench top instruments change. Keeping track of this ever changing landscape presents further challenges. The present invention provides a mechanism for automatically determining the configuration and capabilities of the bench top instruments. In addition, the present invention ranks possible measurement solutions in terms of criteria provided by the user.

In one aspect of the invention, data processing system 21 includes an instrument database 22 that can be viewed as having two component databases. The first component database will be referred to as the instrument catalog in the following discussion. The information in the instrument catalog for a given instrument can be viewed as describing the maximum capabilities of the instrument and how to communicate with the instrument to determine its actual configuration. The instrument catalog includes a detailed description of all of the instruments that can be utilized with the present invention. For any given instrument, this detailed description includes all of the options, both software and hardware, that can be included in the instrument as well as information specifying the types of signals that can be input and output from the instrument, information specifying the measurement accuracy and noise associated with the instrument. The instrument catalog entries for a given instrument also include information on the available options and the specifications for the various measurements with and without those options.

The instrument catalog can also include "software" instruments which are programs that run on a general purpose computer to provide a particular measurement. The software instrument may accept an input from one or more physical instruments and generate a particular measurement as the output. In one aspect of the present invention, a program implementing the present invention automatically updates the database each time the program is launched. The database can be updated in response to a separate "refresh" command. In addition, the discovery process can be triggered periodically in response to a timer. The present invention will only find instruments that are powered up or software instruments that are running on a computer attached to the data processing system that is running the present invention.

In one aspect of the invention, data processing system 21 includes a discovery service that finds each bus connected to data processing system 21 and issues queries on those buses to ascertain an instrument type and the model number of each instrument found. Data processing system 21 then uses that information to lookup the possible instrument configurations for that instrument and particular model using the instrument catalog. The information stored for each instrument and model includes information about the inputs and outputs of the instrument, the possible configurations for the instrument, and options that are available on the instrument. This information will be referred to as capability information in the following discussion. The information also includes commands that can be used to ascertain the features that are present on the particular instrument attached to data processing system 21. This information will be referred to as communication information in the following discussion.

Each instrument intended to work with the present invention includes an interface that responds to a first level query command that enables data processing system 21 to ask for and receive the instrument's model identification code. For the purposes of the present discussion, the model identification code may also include information about the manufacturer. The model identification code uniquely identifies at most one instrument in the instrument catalog.

In one aspect of the invention, the instruments that conform to the standard for this system include a driver that responds to a predetermined query. Most instruments support the SCPI standard, and hence, respond to a predetermined query that returns the instrument manufacturer, model identification code, and serial number. However, queries that return other aspects of the instrument are not standardized.

In general, the type of detailed information available for any specific instrument will depend on the type of instrument. Hence, ascertaining more detailed information depends on the response to the first level query. The response to the first level query is used as a key into the instrument catalog database that provides details on how to further query the instrument to arrive at an accurate description of its current state. This further instrument description can be viewed as including information that would be available from a sales catalog for the instrument, and information on how to obtain more detailed information on the specific instrument that is attached to data processing system 21. The first class of information will be referred to as the manufacturer's catalog information. The manufacturer's catalog information will, in general, be non-proprietary publicly available information about the instrument. For example, if the instrument were a digital multi-meter, the manufacturer's catalog information might include information about the input channel, such as which types of signals the instrument accepts (DC Voltage, DC Current, AC Voltage, and AC Current), the temperature range over which the instrument is designed to operate, as well as specifications for those signals such as voltage and current ranges.

Instruments that are designed to work in the present invention include the ability to respond to a second level of commands by reporting information that is particular to that instrument. This information will be referred to as specific configuration information. The specific configuration information will typically be a subset of the manufacturer's catalog information for the instrument identified in the first query. Modern instruments typically include various hardware or software options that determine some property of the instrument. For example, a signal analyzer could have a number of different frequency ranges that are determined by which of a predetermined number of hardware options has been installed on the analyzer. Some instruments include "slots" that accept one of a plurality of plug-in modules. Each plug-in may be viewed as a hardware option that can be changed after the purchase of the instrument.

In addition, modern instruments include embedded computers that run programs that perform particular computations or other functions on the instrument. The capability of the instrument thus depends on the specific software options that are activated on the instrument. It should be noted that a software option may be implemented by downloading a specific code module to the instrument or by activating a code module that is already in the instrument using a key that is entered when the user pays a license fee. This second type of software option is particularly useful, since the user can increase the capabilities of the instrument without having to download a new component that may require special installation expertise on the user's part. A software module is analogous to a hardware plug-in in the sense that the capability of the instrument can be extended by changing the module to one of a plurality of modules designed to work with the instrument. The queries that elicit the specific configuration information will, in general, be specific to the particular type of instrument, manufacturer, and model. Hence, this query set is stored with the catalog information.

Figure 2:
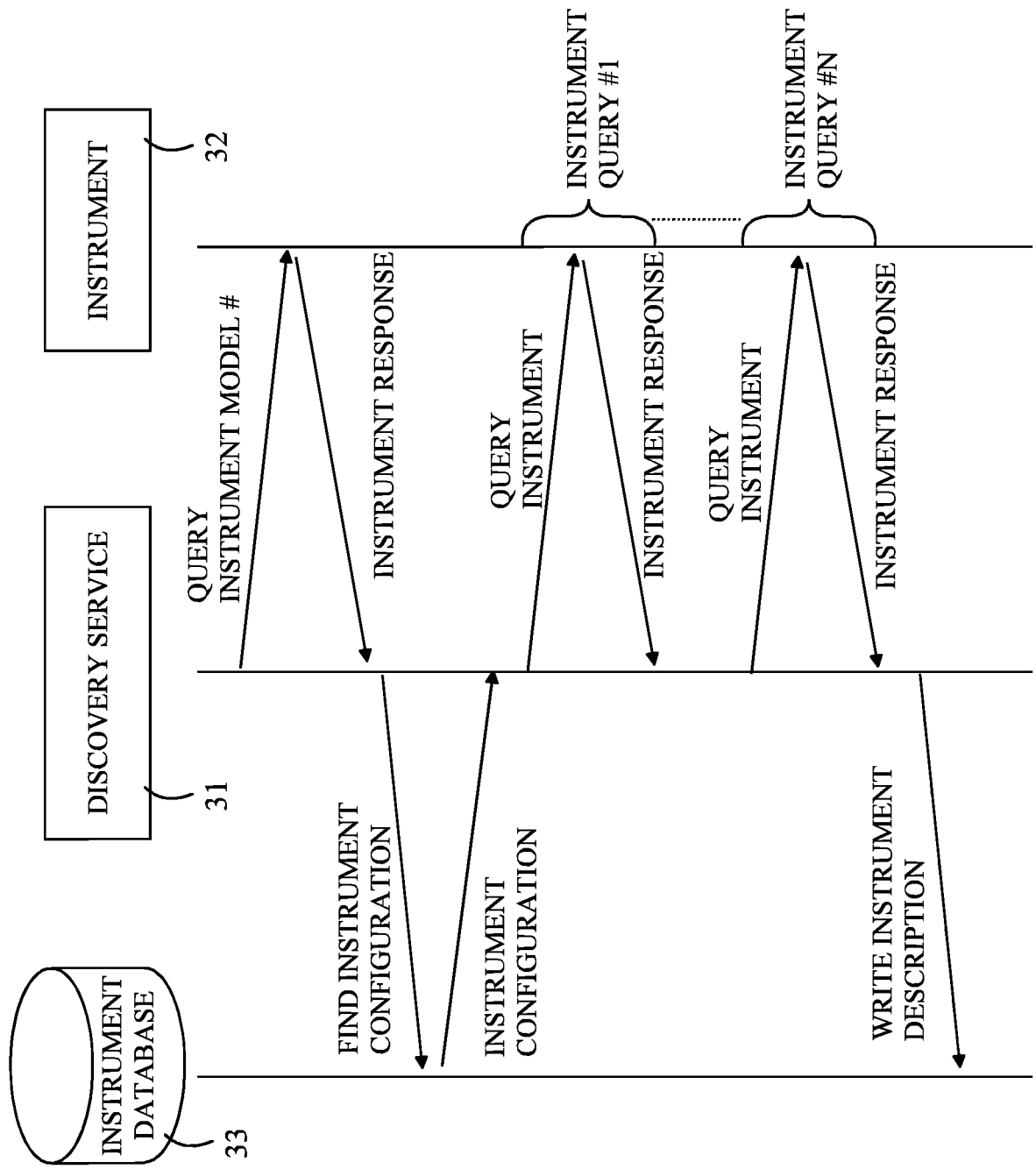
FIG. 2 illustrates the discovery process according to one embodiment of the present invention.

Refer now to FIG. 2, which illustrates the discovery process according to one embodiment of the present invention. The discovery service 31 running on data processing system 21 sends out a query on the bus connecting instrument 32 to data processing system 21. The query requests the instrument model identification code. Instrument 32 then returns its model identification code in a predetermined format that discovery service 31 can decode. Discovery service 31 then uses that model identification code to retrieve the configuration information for that model of instrument from the catalog portion of instrument database 33. For some instruments, the model identification code may completely identify the configuration of the instrument. However, in general, the instrument will have a number of hardware and/or software options that are not uniquely specified by the model identification code. In such cases, the configuration information also includes a series of queries, referred to as option queries, to be sent to the instrument to determine if an option is present. When option queries are present, discovery service 31 sends the option queries in a predetermined order to instrument 32 and uses the instrument's response to determine the status of a particular option or the identity of a further option query to be sent. For example, if the instrument has one or more software options, the first option query might merely inquire as to whether a particular software module is installed. The next option query would illicit the licenses that are installed to determine which features of that software module are activated. This query-response dialog is continued until all of the configuration details for that instrument have been determined.

Once the features of the actual instrument have been determined by data processing system 21, data processing system 21 updates the instrument database 22 to reflect the actual instrument. The configuration of the actual instruments that are present in the system are placed in a second component database referred to as the bench top instruments database.

A researcher wishing to put together a measurement system for a particular task must be able to determine the extent to which the bench top instruments can be used to assemble the solution, and if not, what new instruments or modifications to existing instruments are needed. In many cases, there will be a plurality of possible solutions using the bench top instruments. In this case, ranking those solutions using some user supplied criterion is required. In one aspect of the present invention, data processing system 21 provides the desired instrument search and ranking.

A user having a specific measurement problem can query the bench top instrument database to determine which instruments are capable of making a specific measurement needed by that user. The user would enter the characteristics of the desired instrument such as input and output signal ranges, signal types, etc. Data processing system 21 would then search the bench top instrument records for records conforming to the user's requirements. As noted above, there may be a plurality of instruments that have the desired capability. In this case, the user can enter one or more criteria for ordering the list of instruments based on a user defined criterion. For example, in the multi-meter example, the user could direct data processing system 21 to order the results by the absolute error in the measurements.

In another aspect of the invention, the user can provide input to data processing system 21 indicating the scope of the search for solutions to the user's measurement needs. In the above example, data processing system 21 searched the records in the bench top instrument records that reflect the actual options installed on those instruments during the last discovery process run. However, the bench top instrument capabilities could be expanded by installing one of the hardware or software options that are available for each bench top instrument, but not currently installed. The list of capabilities of the bench top instruments with all possible hardware or software options will be referred to as the augmented bench top capabilities list in the following discussion. Hence, if a first search for a measurement capability using the existing bench top instrument capabilities does not return a satisfactory solution, the user can specify that the augmented bench top capabilities list be used to determine if an option can be purchased to enable the current bench top instruments to provide the desired measurement. The augmented bench top instrument list includes the catalog description for each instrument in the bench top instruments with all of the options available, not just the currently installed options.

If the augmented bench top capabilities list for the bench top instruments does not yield a satisfactory measurement solution, the search list can be further expanded to include the entire instrument catalog database. This expansion of the search is likely to generate many more solutions than needed, and furthermore, the additional solutions may have significant costs that need to be taken into account.

In another aspect of the invention, a cost variable can be added to each of the measurement solutions returned by data processing system 21 in response to the measurement instrument search. The cost of a solution that utilizes the bench top instruments without any augmentation over the current configuration of those instruments would have a cost of zero. If a new option is required on one or more of these instruments to meet the measurement goal, data processing system 21 can determine that cost and update the cost variable accordingly. To implement this feature of the present invention, the catalog database includes a link to a website that keeps the current price list for the various instruments in the catalog and a query that elicits a response that includes the cost of the instrument and/or necessary options.

The instrument catalog can include instrument solutions that are generated by vendors that use the instruments of a manufacturer that has catalog entries that are compatible with those in the catalog database but include other options that are provided by the vendor, such as a software option or specific plug in. These instruments will be referred to as derivative instruments in the following discussion. In one aspect of the invention, data processing system 21 includes a catalog manager that allows an outside vendor to modify the entries in the catalog database to reflect a derivative instrument developed by that vendor without having to write the entire entries for the catalog database.

There are significant variations in the amount and form of the data stored in instrument database 22 from instrument to instrument that reflect the wide range of instruments that are available from a single supplier. The instruments in the instrument catalog can vary in complexity from a simple multi-meter or power supply to network and spectrum analyzers. In one aspect of the invention, this range of information is accommodated by utilizing using a flexible XML document model that adheres to a schema defined using the XML Schema Definition Language (XSD). The manner in which this schema is structured can be more easily understood with respect to entries representing instruments in the instrument catalog.

The Instrument Catalog section of the schema contains information on the physical structure (e.g. number and direction of channels) and the capabilities/specifications of products (e.g. signal ranges, measurement rates, storage capacity, etc.) available from the product catalog of the manufacturer. The information stored in the instrument catalog relates to instrument models, not to specific instances of those models on a user's bench top. Using information stored in the instrument catalog, the discovery service can figure out all possible configurations of a product which can be ordered from the manufacturer, as well as the capabilities of each configuration. In one aspect of the invention, the schema provides support for annotating the models in the instrument catalog with any dependencies they have on hardware options, software licenses, which modules are installed in the instrument (for chassis-based instruments) and the current state of the instrument. For example when building a model of the N9020A Signal Analyzer manufactured by Keysight Technologies, Inc., the schema allows the model to reflect that the frequency range of the instrument is dependent on which hardware options are installed. A N9020A with option 503 installed can accept input signals in the 10 MHz to 3.6 GHz range, whereas an N9020A with option 526 installed can accept input signals in the 10 MHz to 26.5 GHz range. Another example would be that the schema allows the model of an InfiniiVision 4000 Oscilloscope to reflect that the instrument has two output channels only if hardware option DSOX4WAVEGEN2 (dual channel arbitrary waveform generator) is installed.

As noted above, some instruments are chassis-based and allow modules to be placed into slots in the instrument. An example of an entry for a power supply module is shown below:

```
<ModuleConfiguration ModuleNumber="N6731B" Description="N6731B DC Power Module 0-5V, 0-10A, 50W">
    <Options>
        <Option OptionName="054" Description="High Speed Test Extensions"/>
        <Option OptionName="760" Description="Output Disconnect and Polarity Reversal Relays"/>
        <Option OptionName="761" Description="Output Disconnect Relays"/>
    </Options>
    <Channels>
        <Channel Name="1" Direction="Output" Description="Channel 1"/>
    </Channels>
</ModuleConfiguration>
```

In one aspect of the invention, each product supported by the present invention has a data model known as an 'Instrument Configuration' in the instrument catalog. This model acts as the top-level representation for all possible configurations of the product. Each Instrument Configuration can contain one or more of the following sub-elements: a channel, a signal, a range, and a parameter.

A Channel represents a logical input or output port on an instrument or module. For example, a digital multi-meter typically has a single input channel for measuring voltage and current. A triple output power supply has three output channels for delivering power. A channel entry for this power supply would be as follows:

```
<Channels>
    <Channel Name="1" Direction="Output">
        <Signals>
            <Signal SignalType="DC Voltage"/>
        </Signals>
    </Channel>
    <Channel Name="2" Direction="Output">
        <Signals>
            <Signal SignalType="DC Voltage"/>
        </Signals>
    </Channel>
    <Channel Name="3" Direction="Output">
        <Signals>
            <Signal SignalType="DC Voltage"/>
        </Signals>
        <Dependencies>
            <RequiredOptions>
                <Option Option="3CHAN">
            </RequiredOptions>
        </Dependencies>
    </Channel>
</Channels>
```

In this example, the third channel is only present when hardware option "3CHAN" is installed.

As can be seen, the schema allows detailed information about each channel to be captured, including the name and direction of each channel, valid signals available on each channel, and any dependencies the channel has on hardware options or software licenses installed on the instrument.

A Signal represents a signal that is supported on a Channel. For example a waveform generator might support a single output channel, and the channel supports several signals including sine wave, square wave, and ramp. The following is an example of a signal specified within a channel definition:

```
<Channel Name="1" Direction="Output" Description="Channel 1">
    <Signals>
        <Signal SignalType="Sine Wave">
```

-continued

```
        <Parameters/>
        <Dependancies/>
    </Signal>
```

```
        <Signal SignalType="Square Wave">
            <Parameters/>
            <Dependancies/>
        </Signal>
        <Signal SignalType="Sine Wave">
            <Parameters/>
            <Dependancies/>
        </Signal>
        <Signal SignalType="Pulse">
            <Parameters/>
            <Dependancies/>
        </Signal>
        <Signal SignalType="Arb">
            <Parameters/>
            <Dependancies/>
        </Signal>
        <Signal SignalType="Ramp">
            <Parameters/>
            <Dependancies/>
        </Signal>
        <Signal SignalType="Noise">
            <Parameters/>
            <Dependancies>
                <RequiredOptions>
                    <Option Option="NOISE">
                </RequiredOptions>
            </Dependancies>
        </Signal>
    </Signals>
</Channel>
```

A Parameter represents the specification of some important variable of an instrument. For example, a parameter could specify the valid voltage or current range of the channels in an instrument. Parameters can be used to represent a variety of different types of instrument specifications. Parameters have both a name and an associated value. In one aspect of the invention, several different types of parameter values are supported including string, boolean, integer, real, real ranges (e.g. 0.1 to 5.6), and integer ranges (e.g. 1 to 100).

The following is a sample of some valid XML that describes several parameters of the E3640A Power Supply. These include the output power range, instrument type, and transient response recovery time of the instrument:

```
<InstrumentConfiguration ModelName="E3640A" Description="E3640A
30W Power Supply">
    <Parameters>
        <Parameter ParameterName="DC Output Power">
            <Value>
                <UpperBoundedReal Value="30"
                Units="W"/>
            </Value>
        </Parameter>
<Parameter ParameterName="Transient Response Recovery Time">
            <Value>
                <UpperBoundedRealValue="50e-6"
                Units="s"/>
            </Value>
        </Parameter>
        <Parameter ParameterName="Instrument Type">
            <Value>
            <String Value="Power Supply"/>
            </Value>
        </Parameter>
    </Parameters>
</ InstrumentConfiguration ModelName >
```

Specific XML elements in the InstrumentConfiguration schema element also provide information about the queries needed to access the details of the instrument configuration of a particular instrument. These attributes have tags corresponding to slots, options, and licenses. By using the tags OptionQuery, LicenseQuery, and SlotQuery in the instrument catalog, the queries needed to determine the capabilities of the instrument of the corresponding type that is connected to the data processing system can be defined.

For example, an InstrumentConfiguration entry for a Keysight N6700A power supply that has four slots is

```
<InstrumentConfiguration ModelName="N6700A" Description="Low
Profile Modular Power System Mainframe, 400 W, 4 Slots"
SlotQuery="SYST:CHAN:MOD? (@{0})" SlotIndexing="oneBased"/>
```

Similarly, an InstrumentConfiguration entry for a Keysight N9020A MXA Spectrum Analyzer is:

```
<InstrumentConfiguration LicenseQuery="SYST:APPL:CAT?"
ModelName="N9020A" Description="N9020A MXA Signal Analyzer, 10
Hz to 26.5 GHz">
    <Options>
        <Option OptionName="503" Description="Frequency
Range, 10 Hz to 3.6 GHz" OptionQuery="SYST:OPT?"/>
        <Option OptionName="508" Description="Frequency
Range, 10 Hz to 8.4 GHz" OptionQuery="SYST:OPT?"/>
        <Option OptionName="513" Description="Frequency
Range, 10 Hz to 13.6 GHz" OptionQuery="SYST:OPT?"/>
        <Option OptionName="526" Description="Frequency
Range, 10 Hz to 26.5 GHz" OptionQuery="SYST:OPT?"/>
    </Options>
</InstrumentConfiguration>
```

A Range represents a range of values for some parameter on a Specific Signal. For example a power supply could support two voltage ranges: a low range (0 to 8 volts), and a high range (0 to 20 volts). The following code describes two voltage ranges supported on this exemplary power supply:

```
<Signal SignalType="DC Voltage">
    <Ranges>
        <Range RangeName="DC Output Voltage - Low Range">
            <Bounds>
                <RealRange LowerBound="0"
                UpperBound="8" Units="V"/>
            </Bounds>
        </Range>
        <Range RangeName="DC Output Voltage - High Range">
            <Bounds>
                <RealRange LowerBound="0"
                UpperBound="20" Units="V"/>
            </Bounds>
            <Dependancies>
                <RequiredLicenses>
                    <License License="FOO">
                </RequiredLicenses>
            </Dependancies>
        </Range>
    </Ranges>
</Signal>
```

The example has been extended to record that the second range is only present when software license "FOO" is installed.

In one aspect of the invention, data processing system 21 receives user information in the form of a query to run against the bench top instrument database to select instruments having a specific property. For example, the user could request all instruments whose "Instrument Type" property was the value "Power Supply". The query would then return the entry:

```
<InstrumentConfiguration ModelName="E3640A" Description="E3640A
30W Power Supply">
    <Parameters>
        <Parameter ParameterName="Instrument Type">
            <Value>
            <String Value="Power Supply"/>
            </Value>
        </Parameter>
    </Parameters>
</ InstrumentConfiguration ModelName >
```

Many instruments include software that enables the instruments to make specific types of measurements. In one aspect of the invention, there is an XML sub-element called "Drivers" in the InstrumentConfiguration. This element allows the catalog to list the set of software interfaces supported by the instrument. For example, an oscilloscope entry might include:

```
<InstrumentConfiguration ModelName="MSO-X 2024A" Description="MSO-X
2024A InfiniiVision 2000 X-Series Oscilloscope">
    <Drivers>
        <Driver DriverName="IOscilloscope"/>
        <Driver DriverName="IWaveformGenerator"/>
    </Drivers>
</InstrumentConfiguration>
```

In the example above the instrument supports the "IOscilloscope" and "IWaveformGenerator" software interfaces. In general, the functionality of each instrument will be described by a set of interfaces, and each InstrumentConfiguration is annotated to indicate which software interfaces that the specific instrument supports. If this oscilloscope supported Eye diagrams then an additional Driver entry of the form <Driver DriverName="IEyeDiagram"/> would be added to the InstrumentConfiguration. By querying the InstrumentConfigurations and InstrumentDescriptions, the data processing system can return list of instruments that support specific interfaces or measurements. Hence, a user can determine what instruments will support a desired measurement. This search can be performed in a manner analogous to that described above starting with the bench top instruments. If none of the bench top instruments currently support the desired measurement, the search can be expanded to the bench top instruments augmented with possible software options that are not currently available or to the instrument catalog to identify instruments that can be purchased to provide the desired capability.

While a person wishing to create a new catalog entry or modify an existing catalog entry can create the schema entries directly for the entries in question, such data entry can be cumbersome and error prone. Hence, in one aspect of the invention, a catalog management system is utilized for these tasks. The catalog management system can operate on the data processing system 21 discussed above, or on a separate data processing system. To define a new instrument, each of the possible tag names is presented to the user with a field for the user to enter the relevant data. The catalog manager then translates the data to the appropriate XML format and generates a new catalog. The user can start from scratch for a particular instrument or copy another instrument's entry and then modify that entry if the two instruments are sufficiently similar to one another.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method executable by a data processing system to discover attributes of a plurality of instruments connected to said data processing system, said method comprising:

receiving from a user interface a capability requirement specifying a characteristic of an instrument needed to make a measurement;

determining the plurality of instruments connected to said data processing system on one or more computer network communication links by sending a first query on one of said computer network communication links connected to said data processing system, at least one instrument of said plurality instruments responding to the first query on said one of said computer network communication links connected to the at least one instrument by sending a response comprising a model identification code for the at least one instrument;

retrieving model configuration information from an instrument catalog database attached to said data processing system, said model configuration information comprising an option that is available on said at least one instrument;

sending a second query, different from the first query, to the at least one instrument on said one of said computer network communication links, the second query specifying said option that is available on said at least one instrument;

receiving a response from the at least one instrument on said one of said computer network communication links indicative of whether said at least one instrument has said option installed;

determining whether said option satisfies said capability requirement when said option is installed; and communicating that said option is installed and satisfies said capability requirement when said option is installed and satisfies said capability requirement.

2. The method of claim 1 wherein said model configuration information comprises all options that are available on each instrument in said instrument catalog database, including said option specified in the second query.

3. The method of claim 1 wherein each instrument of said plurality of instruments responds to said first query with a corresponding model identification code in a predetermined format, said model identification code uniquely identifying the instrument in said instrument catalog database.

4. The method of claim 1 wherein a bench top instrument database is connected to said data processing system, and wherein said method further comprises causing said data processing system to generate a bench top instrument database entry for the at least one instrument, said bench top instrument database entry specifying all options that are installed on the at least one instrument.

5. The method of claim 4 wherein said bench top instrument database comprises all options that are installed on all instruments in said plurality of instruments that are connected to said data processing system.

6. The method of claim 4 wherein said bench top instrument database comprises information specifying a type of measurement that can be made by the at least one instrument.

7. The method of claim 4 further comprising retrieving bench top instrument database entries for all instruments in said bench top instrument database satisfying a user defined criterion.

8. The method of claim 7 wherein said retrieved bench top instrument database entries are ordered by a user supplied criterion.

9. The method of claim 7 wherein retrieving the bench top instrument database entries for all instruments in said bench top instrument database comprises retrieving bench top instrument database entries that would satisfy said capability requirement when said instrument is equipped with an option that is available for said instrument, but not currently installed on said instrument.

10. A computer readable medium storing instructions for discovering attributes of a plurality of instruments connected to a data processing system that, when executed, cause the data processing system:

to receive from a user interface a capability requirement specifying a characteristic of an instrument needed to make a measurement;

to determine the plurality of instruments connected to said data processing system on one or more computer network communication links by sending a first query on one of said computer network communication links connected to said data processing system, at least one instrument of the plurality of instruments responding to the first query on said one of said computer network communication links connected to the at least one instrument by sending a response comprising a model identification code for the at least one instrument;

to retrieve model configuration information from an instrument catalog database attached to said data processing system, said model configuration information comprising an option that is available on the at least one instrument;

to send a second query, different from said first query, to the at least one instrument on said one of said computer network communication links, the second query specifying said option that is available on the at least one instrument;

to receive a response from the at least one instrument on said one of said computer network communication links indicative of whether the at least one instrument has said option installed;

to determine whether said option satisfies said capability requirement when said option is installed; and to communicate that said option is installed and satisfies said capability requirement when said option is installed and satisfies said capability requirement.

11. The computer readable medium of claim 10 wherein said model configuration information comprises all options that are available on each instrument of the plurality of instruments included in said instrument catalog database.

12. The computer readable medium of claim 10 wherein each instrument of said plurality of instruments responds to said first query with a corresponding model identification code in a predetermined format, said model identification code uniquely identifying the instrument in said instrument catalog database.

13. The computer readable medium of claim 10 wherein a bench top instrument database is connected to said data processing system, and wherein the instructions further cause said data processing system to generate a bench top instrument database entry for the at least one instrument, said bench top instrument database entry specifying all options that are installed on the at least one instrument.

14. The computer readable medium of claim 13 wherein said bench top instrument database comprises all options that are installed on all instruments in said plurality of instruments that are connected to said data processing system.

15. The computer readable medium of claim 13 wherein said bench top instrument database comprises information specifying a type of measurement that can be made by the at least one instrument.

16. The computer readable medium of claim 13 wherein the instructions further cause said data processing system to retrieve bench top instrument database entries for all instruments in said bench top instrument database satisfying a user defined criterion.

17. The computer readable medium of claim 16 wherein said retrieved bench top instrument database entries are ordered by user supplied criterion.

18. The computer readable medium of claim 16 wherein retrieving the bench top instrument database entries for all instruments in said bench top instrument database comprises retrieving bench top instrument database entries that would satisfy said capability requirement when said instrument is equipped with an option that is available for said instrument, but not currently installed on said instrument.

19. A system for discovering attributes of a plurality of instruments, the system comprising:
- a data processing system;
- one or more computer network communication links connected to the data processing system, the one or more computer network communication links being configured to connect the data processing system with the plurality of instruments;
- an instrument catalog database configured to store model configuration information for the plurality of instruments respectively; and
- a non-transitory memory configured to store instructions that, when executed by the data processing system, cause the data processing system to:
  - receive a capability requirement from a user specifying a characteristic of an instrument needed to make a measurement;
  - determine the plurality of instruments connected to the data processing system on one or more computer network communication links by sending a first query on one of the computer network communication links, at least one instrument of the plurality of instruments responding to the first query on the one of the computer network communication links connected to the at least one instrument by sending a response comprising a model identification code for the at least one instrument;
  - retrieve model configuration information for the at least one instrument from the instrument catalog database, the model configuration information comprising an option that is available on the at least one instrument;
  - send a second query, different from the first query, to the at least one instrument on the one of the computer network communication links, the second query specifying the option that is available on the at least one instrument;
  - receive a response from the at least one instrument on the one of the computer network communication links indicative of whether the at least one instrument has the option installed;
  - determine whether the option satisfies the capability requirement when the option is installed; and
  - communicate that the option is installed and satisfies the capability requirement when it is determined that the option is installed and satisfies the capability requirement.

20. The system of claim 19, further comprising:
a bench top instrument database connected to the data processing system, wherein the instructions further cause the data processing system to generate a bench top instrument database entry for the at least one instrument, the bench top instrument database entry specifying all options that are installed on the at least one instrument.

* * * * *